P. WELL.
Hog-Traps.
No. 155,908. Patented Oct. 13, 1874.
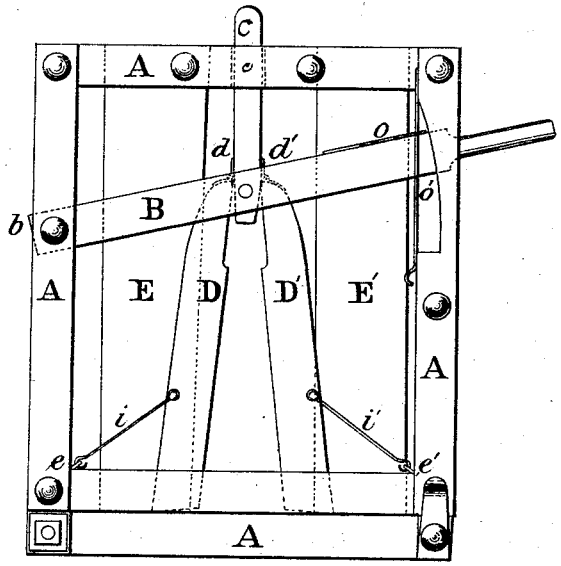
FIG I
FIG II
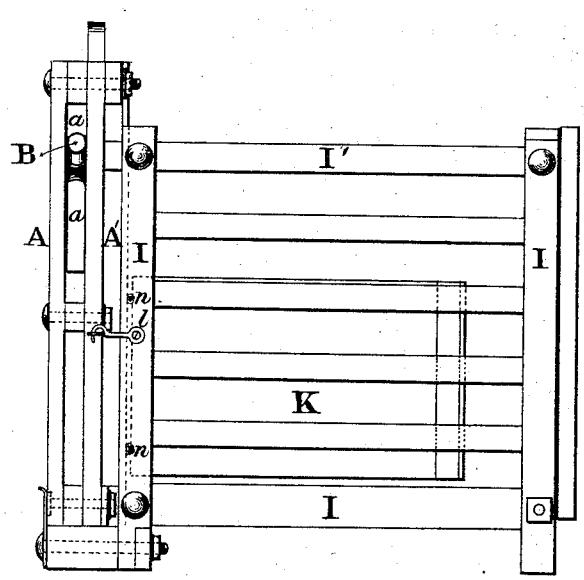
WITNESSES
INVENTOR
Peter Well
per atty.
A. H. Evans & Co.

UNITED STATES PATENT OFFICE.

PETER WELL, OF ELWOOD, ASSIGNOR TO JOHN H. PEGGS, OF GREENWOOD, INDIANA.

IMPROVEMENT IN HOG-TRAPS.

Specification forming part of Letters Patent No. 155,908, dated October 13, 1874; application filed July 27, 1874.

*To all whom it may concern:*

Be it known that I, PETER WELL, of Elwood, in the county of Madison and State of Indiana, have invented a new and Improved Hog-Trap, to catch and hold hogs pending their being ringed, marked, castrated, or spayed; and I hereby declare the following to be a full, clear, and exact description thereof, reference being had to the accompanying drawings making a part of this specification, in which—

Figure 1 is a front view of my device. Fig. 2 is a side view of the same.

The object of my invention is to provide a device by which I can secure and hold hogs and other animals, without injury to them, while they are being ringed, marked, spayed, castrated, &c.; and it consists of a pen having an opening in one side, across which operate two reciprocating jaws, operated by a lever. It also consists in arranging with said holding-levers a swinging table, which is utilized for receiving the weight of the hog while the operation is being performed.

In order that those skilled in the art may make and use my invention, I will proceed to describe the manner in which I have carried it out.

In the said drawings, A A' is a stout wooden frame, having the pieces doubled, as shown, and all bolted together, leaving the space $a\ a$ as a guide for the lever B, which is pivoted at $b$. To the center of lever B is pivoted a standard, C, which runs up through a slot, $c$, in the top of the frame A. Hinged to each side of the standard, at $d\ d'$, are two jaws, D D', working loosely at their ends, and having short connecting-rods $i\ i'$ attached to them and hooked into eyes $e\ e'$, which are located in the lower corners of the frame A. The jaws D D' work in front of two board-bars or boards, E E', running from the top to the bottom of the frame, and having only room enough between them for an animal to pass through.

It is evident that when an animal attempts to pass between the jaws D D', when they are in the position shown in Fig. 1 and the lever B is depressed, the jaws will come together and hold him.

I provide the frame A with removable wings I I', which are hooked at $l$, or fastened by any other convenient means. The two wings and frame A form three sides of a pen. On the inside of the board E, at its edge, I provide eyes $n\ n$, as seen in Fig. 2, for the purpose of attaching a removable table, K, by means of hooks at its end. The under side of this table has a swinging leg, by means of which I am enabled to adjust the height of the table.

The operation is as follows: An animal is driven from within toward the opening between the jaws. As it attempts to pass out the lever is suddenly depressed, the jaws come together, and it is held by means of a toothed rack, $o'$, on the frame and plate $o$ on the lever, which keeps the lever down. The operator then moves the hinged table K up against the side of the animal, holds it there, and the entire pen is turned over on its side, leaving the animal lying on the table, which is supported by the hinged leg under it. The animal may be attached to the table by a rope over his hind legs.

By this means I am enabled to catch animals and hold them securely without the least injury or jar to them.

Having thus described my invention, what I claim as new, and desire to secure by Letters Patent, is—

1. The lever B, in combination with the jaws D D' and rods $i\ i'$, for the purpose of catching and holding the animal, substantially as set forth.

2. The frame A and jaws D D', in combination with the swinging vertical table K, as set forth.

PETER WELL.

Witnesses:
JESSE WISE,
JAMES A. WRIGHT.